(12) United States Patent
Wakita et al.

(10) Patent No.: US 12,693,014 B2
(45) Date of Patent: Jul. 28, 2026

(54) COMBUSTOR PANEL AND GAS TURBINE COMBUSTOR

(71) Applicant: MITSUBISHI HEAVY INDUSTRIES AERO ENGINES, LTD., Komaki (JP)

(72) Inventors: Yoshinori Wakita, Tokyo (JP); Shigenari Horie, Tokyo (JP)

(73) Assignee: MITSUBISHI HEAVY INDUSTRIES AERO ENGINES, LTD., Komaki (JP)

( * ) Notice: Subject to any disclaimer, the term of this patent is extended or adjusted under 35 U.S.C. 154(b) by 66 days.

(21) Appl. No.: 18/684,950

(22) PCT Filed: Aug. 24, 2022

(86) PCT No.: PCT/JP2022/031900
§ 371 (c)(1),
(2) Date: Feb. 20, 2024

(87) PCT Pub. No.: WO2023/027116
PCT Pub. Date: Mar. 2, 2023

(65) Prior Publication Data
US 2025/0129938 A1 Apr. 24, 2025

(30) Foreign Application Priority Data

Aug. 25, 2021 (JP) ................................. 2021-137029

(51) Int. Cl.
*F23R 3/00* (2006.01)
*F02C 7/18* (2006.01)
*F23R 3/60* (2006.01)

(52) U.S. Cl.
CPC ................ *F23R 3/002* (2013.01); *F02C 7/18* (2013.01); *F23R 3/005* (2013.01); *F23R 3/60* (2013.01); *F23R 2900/03045* (2013.01)

(58) Field of Classification Search
CPC .. F02C 7/18; F23R 3/002; F23R 3/005; F23R 3/60; F23R 2900/03043; F23R 2900/03044; F23R 2900/03045; F05D 2260/22141
See application file for complete search history.

(56) References Cited

U.S. PATENT DOCUMENTS

| | | | | |
|---|---|---|---|---|
| 10,830,448 B2 * | 11/2020 | Pacheco-Tougas | ..... | F23R 3/002 |
| 11,021,999 B2 * | 6/2021 | Okabe | ..................... | F23R 3/002 |

(Continued)

FOREIGN PATENT DOCUMENTS

| | | | |
|---|---|---|---|
| JP | 2001-096170 A | 4/2001 |
| JP | 3469412 B2 | 11/2003 |

(Continued)

OTHER PUBLICATIONS

International Search Report and Written Opinion of PCT Application No. PCT/JP2022/031900 dated Nov. 1, 2022, 10 pp.

*Primary Examiner* — Gerald L Sung
*Assistant Examiner* — Henry Ng
(74) *Attorney, Agent, or Firm* — HAUPTMAN HAM, LLP

(57) ABSTRACT

A combustor panel includes: a first panel; a second panel which is facing the first panel to define a flow path, through which cooling air flows, between the first panel and the second panel, a gas path surface which is allowed to be brought into contact with combustion gas is formed on a surface of the second panel opposite to the flow path; and a plurality of streamlined fins which are formed between the first panel and the second panel in the flow path so as to be arranged at intervals from each other, and each of which has a front edge at an upstream side in a flow direction of the cooling air and a rear edge at a downstream side in the flow direction.

5 Claims, 8 Drawing Sheets

(56) References Cited

U.S. PATENT DOCUMENTS

| | | | |
|---|---|---|---|
| 2008/0063524 A1 | 3/2008 | Tibbott | |
| 2009/0100838 A1* | 4/2009 | Carlisle | F23R 3/002 |
| | | | 60/753 |
| 2012/0255311 A1* | 10/2012 | Miyake | F28F 3/022 |
| | | | 29/890.035 |
| 2012/0272521 A1* | 11/2012 | Lee | F23R 3/46 |
| | | | 60/39.01 |
| 2013/0160423 A1* | 6/2013 | Wasif | F23R 3/26 |
| | | | 60/39.23 |
| 2013/0243575 A1* | 9/2013 | Zelesky | F01D 5/186 |
| | | | 415/116 |
| 2014/0096527 A1* | 4/2014 | Bangerter | F23R 3/04 |
| | | | 60/754 |
| 2014/0238031 A1 | 8/2014 | Okita et al. | |
| 2014/0290257 A1* | 10/2014 | Okita | F01D 5/187 |
| | | | 60/752 |
| 2015/0033697 A1* | 2/2015 | Morrison | F23R 3/002 |
| | | | 60/39.83 |
| 2015/0101336 A1* | 4/2015 | Numata | F23R 3/16 |
| | | | 60/755 |
| 2015/0198335 A1 | 7/2015 | Kim et al. | |
| 2015/0292742 A1 | 10/2015 | Spence et al. | |
| 2015/0369486 A1* | 12/2015 | Yokota | F23R 3/54 |
| | | | 60/754 |
| 2016/0102861 A1* | 4/2016 | Cunha | F23R 3/002 |
| | | | 60/752 |
| 2016/0116166 A1* | 4/2016 | Drake | F23R 3/06 |
| | | | 60/752 |
| 2016/0123592 A1* | 5/2016 | Drake | F23R 3/06 |
| | | | 60/752 |
| 2016/0238249 A1 | 8/2016 | Cunha et al. | |
| 2016/0265772 A1* | 9/2016 | Eastwood | F23R 3/04 |
| 2017/0003027 A1* | 1/2017 | Kostka | F23R 3/005 |
| 2017/0138596 A1* | 5/2017 | Freeman | F23R 3/10 |
| 2017/0191417 A1* | 7/2017 | Bunker | F01D 25/12 |
| 2018/0283182 A1* | 10/2018 | Kamrath | F01D 5/18 |
| 2019/0063750 A1* | 2/2019 | Porter | F23R 3/005 |
| 2019/0078785 A1* | 3/2019 | Propheter-Hinckley | |
| | | | F23R 3/54 |
| 2019/0128524 A1* | 5/2019 | Lee | F23R 3/04 |
| 2019/0162483 A1 | 5/2019 | Ono et al. | |
| 2019/0186375 A1* | 6/2019 | Lowery | F23C 99/001 |
| 2019/0186740 A1* | 6/2019 | Moura | F23R 3/06 |
| 2020/0003060 A1* | 1/2020 | Rodriguez | F01D 5/187 |
| 2020/0003120 A1* | 1/2020 | Heneveld | F02C 7/12 |
| 2020/0080796 A1* | 3/2020 | Dasgupta | F28F 7/02 |
| 2020/0182470 A1* | 6/2020 | Kramer | F23R 3/002 |
| 2020/0224875 A1* | 7/2020 | Murray | F23R 3/002 |
| 2020/0240640 A1* | 7/2020 | Lao | F02C 6/08 |
| 2020/0263607 A1* | 8/2020 | Porter | B22C 7/02 |
| 2020/0326069 A1 | 10/2020 | Myatlev et al. | |
| 2021/0156264 A1* | 5/2021 | Richerson | F01D 5/187 |

FOREIGN PATENT DOCUMENTS

| | | | |
|---|---|---|---|
| JP | 3580942 B2 | 10/2004 | |
| JP | 2013-104307 A | 5/2013 | |
| JP | 6663899 B2 | 3/2020 | |

\* cited by examiner

COMBUSTOR PANEL AND GAS TURBINE COMBUSTOR

TECHNICAL FIELD

The present disclosure relates to a combustor panel and a gas turbine combustor.

Priority is claimed on Japanese Patent Application No. 2021-137029, filed Aug. 25, 2021, the content of which is incorporated herein by reference.

BACKGROUND ART

Patent Document 1 discloses a gas turbine combustor that includes a combustor liner that mixes and burns combustion gas and compressed air. The combustor liner is composed of a double-layered combustor panel having an outer wall portion and an inner wall portion. An inner surface of the inner wall portion opposite to the outer wall portion is exposed to a combustion gas and becomes hot. Therefore, a flow path through which cooling air flows is formed between the outer wall portion and the inner wall portion. A heat dissipation pin is provided between the inner wall portion and the outer wall portion. The heat dissipation pin protrudes from an outer surface of the inner wall portion toward the outer wall portion. The heat dissipation pin improves the cooling effect of the cooling air flowing within the flow path by transferring beat from the inner surface of the inner wall portion exposed to high temperatures into the flow path and increasing the heat release area in the flow path.

CITATION LIST

Patent Document

[Patent Document 1]
    Japanese Unexamined Patent Application, First Publication No. 2013-104307

SUMMARY OF INVENTION

Technical Problem

However, in the gas turbine combustor described in Patent Document 1, when the cooling air is introduced into the flow path from the outer wall portion toward the inner wall portion, the cooling air receives a reaction force from the inner wall portion and a secondary flow is formed in which the cooling air moves away from the inner wall portion. Therefore, the cooling air cannot flow along the inner wall portion, and the expected cooling effect may not be obtained in some cases.

The present disclosure has been made to solve the above-described problems and an object thereof is to provide a combustor panel and a gas turbine combustor capable of improving the cooling effect of cooling air.

Solution to Problem

In order to achieve the aforementioned objects, a combustor panel according to the present disclosure includes: a first panel; a second panel which is facing the first panel to define a flow path, through which cooling air flows, between the first panel and the second panel, a gas path surface which is allowed to be brought into contact with combustion gas is formed on a surface of the second panel opposite to the flow path; and a plurality of streamlined fins which are formed between the first panel and the second panel in the flow path so as to be arranged at intervals from each other, and each of which has a front edge at an upstream side in a flow direction of the cooling air and a rear edge at a downstream side in the flow direction, wherein each of the fins is formed such that a dimension in a width direction intersecting both of the flow direction and a direction in which the first panel and the second panel face each other is increased towards the first panel from the second panel.

A gas turbine combustor according to the present disclosure includes a combustor liner formed by the combustor panel.

Advantageous Effects of Invention

According to the combustor panel and the gas turbine combustor of the present disclosure, the cooling effect of cooling air can be improved.

BRIEF DESCRIPTION OF DRAWINGS

FIG. 3 is a cross-sectional view showing a schematic configuration of a combustor panel according to the first embodiment of the present disclosure where it is sectioned in a length direction.

FIG. 8 is a cross-sectional view showing a schematic configuration of a combustor panel according to a second embodiment of the present disclosure where it is sectioned in a length direction.

FIG. 9 is a cross-sectional view showing a schematic configuration of the combustor panel according to the second embodiment of the present disclosure when viewed in a flow direction.

DESCRIPTION OF EMBODIMENTS

First Embodiment

Hereinafter, a gas turbine 1 according to a first embodiment of the present disclosure will be described in detail with reference to FIGS. 1 to 7.

(Gas Turbine)

Figure 1:
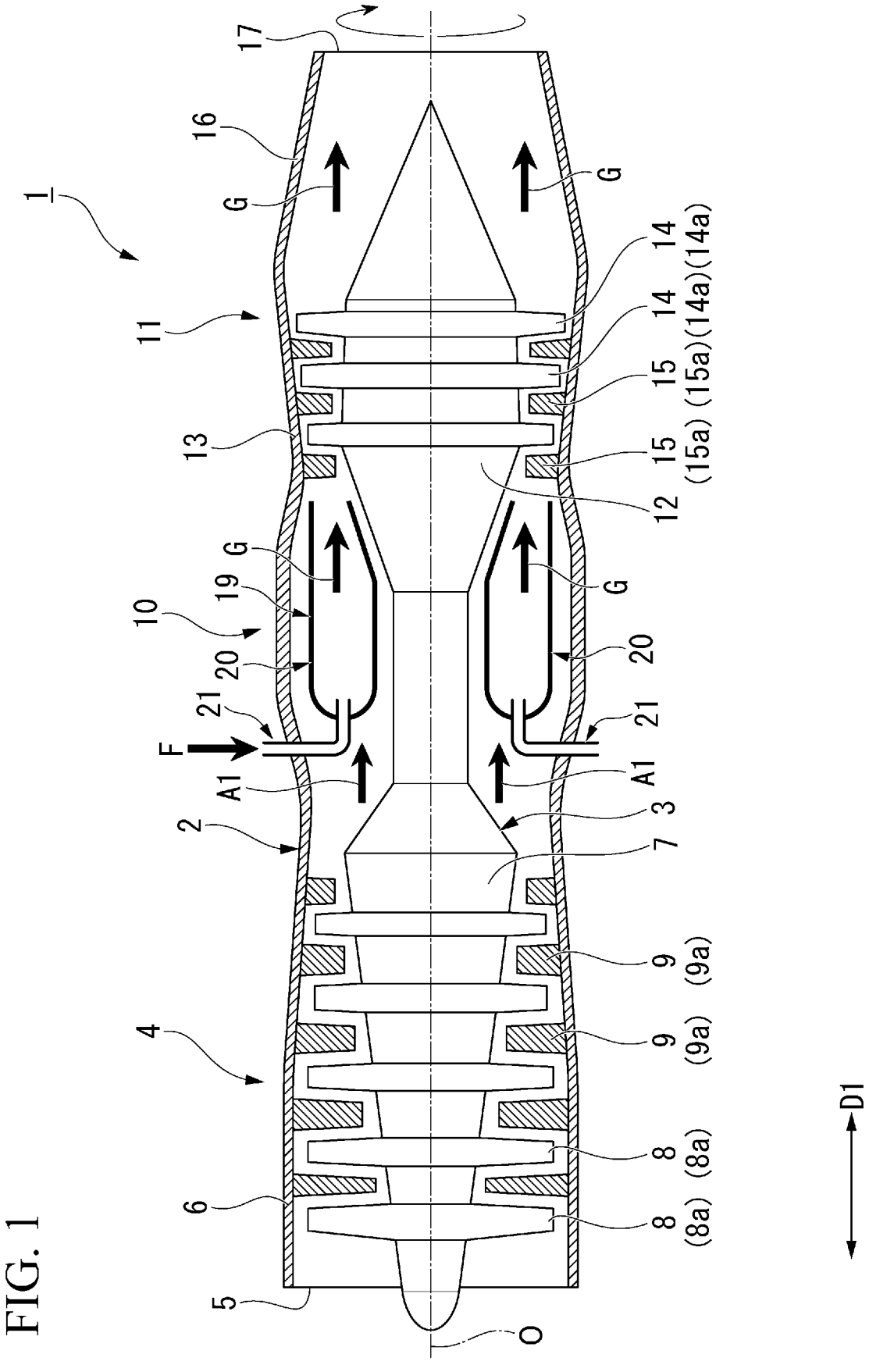
FIG. 1 is a cross-sectional view showing a schematic configuration of an aircraft gas turbine according to a first embodiment of the present disclosure when taken along an axis.

The gas turbine 1 of this embodiment is used as an aircraft engine. As shown in FIG. 1, the gas turbine 1 includes a compressor 4, a combustor (gas turbine combustor) 19, and a turbine 11.

(Compressor)

The compressor 4 generates compressed air A1 by compressing air taken from an intake duct 5. The compressor 4 includes a compressor casing 6, a compressor rotor shaft 7, a compressor rotor blade stage 8, and a compressor stator blade stage 9. The compressor casing 6 covers the compressor rotor shaft 7 from the outer peripheral side and extends in a direction in which an axis O extends (hereinafter, referred to as the direction of the axis O).

A plurality of the compressor rotor blade stages 8 are provided in the compressor rotor shaft 7. These compressor rotor blade stages 8 are arranged at intervals in the direction of the axis O. Each of the plurality of compressor rotor blade stages 8 includes a plurality of compressor rotor blades 8a. The compressor rotor blades 8a extend in a direction along the radius of a virtual circle centered on the axis O (hereinafter, referred to as the radial direction). The compressor rotor blades 8a of each compressor rotor blade stage 8 are arranged on the outer peripheral surface of the compressor rotor shaft 7 in a direction centered on the axis O (hereinafter, referred to as the circumferential direction).

A plurality of the compressor stator blade stages 9 are provided in the compressor casing 6. These compressor stator blade stages 9 are arranged at intervals in the direction of the axis O. The compressor stator blade stages 9 are arranged alternately with the compressor rotor blade stages 8 in the direction of the axis O. Each of the plurality of compressor stator blade stages 9 includes a plurality of compressor stator blades 9a. The compressor stator blades 9a of each compressor stator blade stage 9 are arranged in the circumferential direction on the inner peripheral surface of the compressor casing 6.

(Combustor)

The combustor 19 is disposed inside a combustion chamber 10 provided between the compressor casing 6 and the turbine casing 13 of the turbine 11. The combustor 19 generates a combustion gas G by mixing and burning fuel F in the compressed air A1 generated by the compressor 4. The combustion gas G generated by the combustor 19 is supplied to the turbine 11. The detailed configuration of the combustion chamber 10 and the combustor 19 will be described later.

(Turbine)

The turbine 11 is driven by the combustion gas G having a high temperature and a high pressure generated by the combustion chamber 10. More specifically, the turbine 11 converts the thermal energy of the combustion gas G into rotational energy by expanding the combustion gas G having a high temperature and a high pressure. The turbine 11 includes a turbine casing 13, a turbine rotor shaft 12, a turbine rotor blade stage 14, and a turbine stator blade stage 15.

The turbine casing 13 covers the turbine rotor shaft 12 from the outside in the radial direction. The turbine casing 13, the compressor casing 6, and the combustion chamber 10 are integrally connected along the axis O. The compressor casing 6, the combustion chamber 10, and the turbine casing 13 constitute a gas turbine casing 2.

The turbine rotor shaft 12 extends in the direction of the axis O. The turbine rotor shaft 12 and the compressor rotor shaft 7 are arranged in the direction of the axis O) and are immovable relative to each other. The turbine rotor shaft 12 and the compressor rotor shaft 7 constitute a gas turbine rotor shaft 3. The gas turbine rotor shaft 3 is integrally rotatable around the axis O within the gas turbine casing 2.

A plurality of the turbine rotor blade stages 14 are provided on the outer peripheral surface of the turbine rotor shaft 12 at intervals in the direction of the axis O. Each of the plurality of turbine rotor blade stages 14 includes a plurality of turbine rotor blades 14a. The plurality of turbine rotor blades 14a of one turbine rotor blade stage 14 are arranged at equal intervals in the circumferential direction.

A plurality of the turbine stator blade stages 15 are provided on the inner peripheral surface of the turbine casing 13 at intervals in the direction of the axis O. The plurality of turbine stator blade stages 15 are alternately arranged with the turbine rotor blade stages 14 in the direction of the axis O). Each of the turbine stator blade stages 15 includes a plurality of turbine stator blades 15a. The turbine stator blades 15a provided in each turbine stator blade stage 15 are arranged on the inner peripheral surface of the turbine casing 13 at equal intervals in the circumferential direction.

In operating the gas turbine 1 configured as described above, first, the compressor rotor shaft 7 is rotationally driven by an external drive source. As the compressor rotor shaft 7 rotates, external air is sequentially compressed to generate the compressed air A1. The compressed air A1 is supplied into the combustion chamber 10 through the compressor casing 6. In the combustion chamber 10, the compressed air A1 is mixed with the fuel F by the combustor 19 and then burned to generate high-temperature and high-pressure combustion gas G. The combustion gas G is supplied into the turbine 11 through the turbine casing 13.

In the turbine 11, the combustion gas G sequentially collides with the turbine rotor blade stage 14 and the turbine stator blade stage 15 to apply a rotational driving force to the turbine rotor shaft 12. The rotational energy is mainly used to drive the compressor 4. The combustion gas G driven the turbine 11 has its flow velocity increased by an exhaust nozzle 16 to become a jet that generates thrust, and is discharged to the outside from the injection port 17.

(Detailed Configuration of Combustion Chamber)

The combustion chamber 10 covers part of the turbine rotor shaft 12, which is closed to the compressor 4 more than the turbine rotor blade stage 14 and the turbine stator blade stage 15 in the direction of the axis O, from the radial outer side. The combustion chamber 10 forms an annular shape around the turbine rotor shaft 12.

(Detailed Configuration of Combustor)

The combustor 19 includes a combustor liner 20 and a fuel supply nozzle 21.

(Combustor Liner)

The combustor liner 20 is a so-called annular liner formed in an annular shape around the turbine rotor shaft 12.

The fuel supply nozzle 21 is connected to the end of the combustor liner 20 on the side of the compressor 4 in the direction of the axis O. A plurality of the fuel supply nozzles 21 are connected to the annular combustor liner 20 in the circumferential direction at predetermined intervals. The fuel F is supplied from the outside into a combustion area S1 within the combustor liner 20 through the fuel supply nozzle 21.

Figure 2:
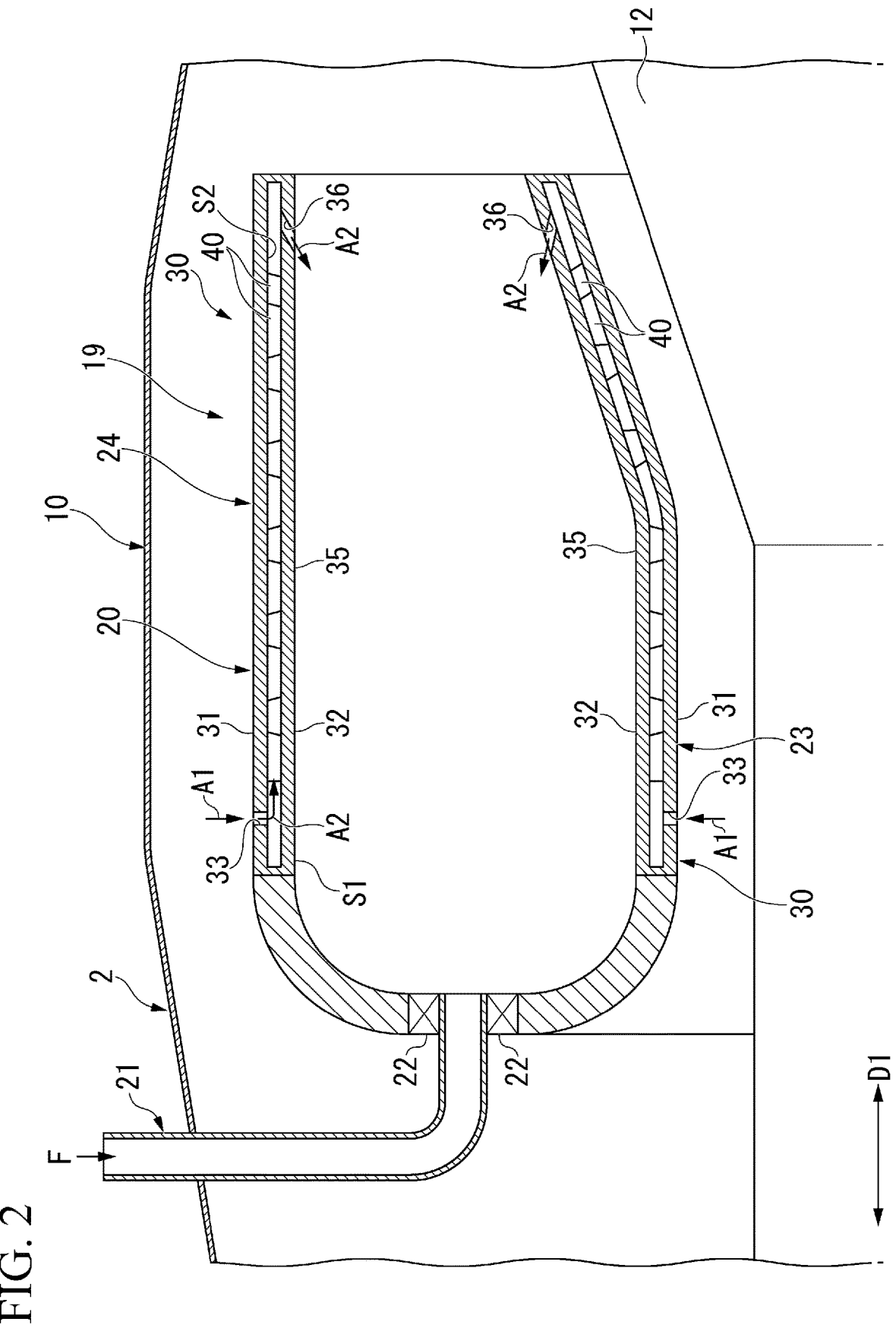
FIG. 2 is a cross-sectional view showing a schematic configuration of a combustor liner according to the first embodiment of the present disclosure when taken along an axis.

As shown in FIG. 2, a swirler 22 is provided around each fuel supply nozzle 21. The swirler 22 guides the compressed air A1, supplied from the compressor 4, into the combustion area S1 from the vicinity of the fuel supply nozzle 21 and provides a swirling flow to generate the combustion gas G in which the fuel F and the compressed air A1 are mixed (see FIG. 1).

The combustor liner 20 includes an inner wall portion 23 and an outer wall portion 24. The inner wall portion 23 is formed in an annular shape which covers the turbine rotor shaft 12 from the outside in the radial direction. The outer wall portion 24 is formed in an annular shape which further covers the inner wall portion 23 from the outside in the radial direction. A space sandwiched in the radial direction by the inner wall portion 23 and the outer wall portion 24 is the combustion area S1 of the combustor liner 20. The inner wall portion 23 and the outer wall portion 24 are composed of a plurality of combustor panels 30.

(Combustor Panel)

Each combustor panel 30 has the same configuration. However, the combustor panel 30 of the outer wall portion 24 is formed in a rectangular plate shape extending in the direction of the axis O) (see FIG. 1), whereas the combustor panel 30 of the inner wall portion 23 is formed to extend along the outer peripheral surface of the gas turbine rotor shaft 3 in the direction of the axis O. In this embodiment, the combustor panel 30 of the inner wall portion 23 is formed by bending the combustor panel 30 of the outer wall portion 24 radially outward at the intermediate portion in the direction of the axis O. The inner wall portion 23 and the outer wall portion 24 are formed by connecting both edges of the plurality of combustor panels 30 in the short direction to form an annular shape.

Hereinafter, one combustor panel 30 constituting the outer wall portion 24 will be described and descriptions of the combustor panels 30 on the outer wall portion 24 and the combustor panels 30 on the inner wall 23 will be omitted.

Hereinafter, the long direction of the combustor panel 30 is referred to as the length direction D1, the short direction of the combustor panel 30 is referred to as the width direction D2 (see FIG. 4), and the direction orthogonal to the length direction D1 and the width direction D2 is referred to as the height direction D3. The length direction D1 is along the direction of the axis O. The width direction D2 is along the circumferential direction. The height direction D3 is along the radial direction.

Figure 3:
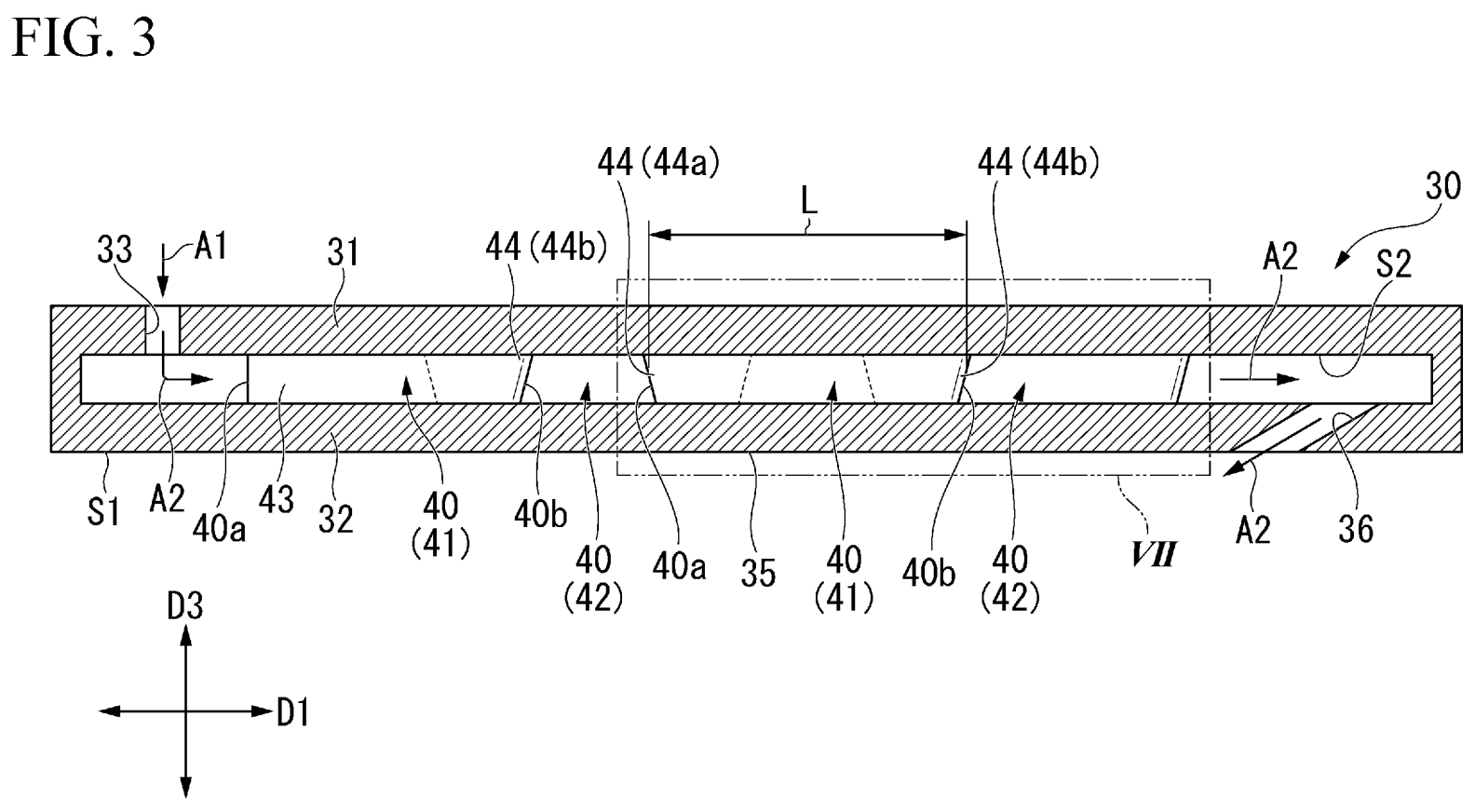
Figure 4:
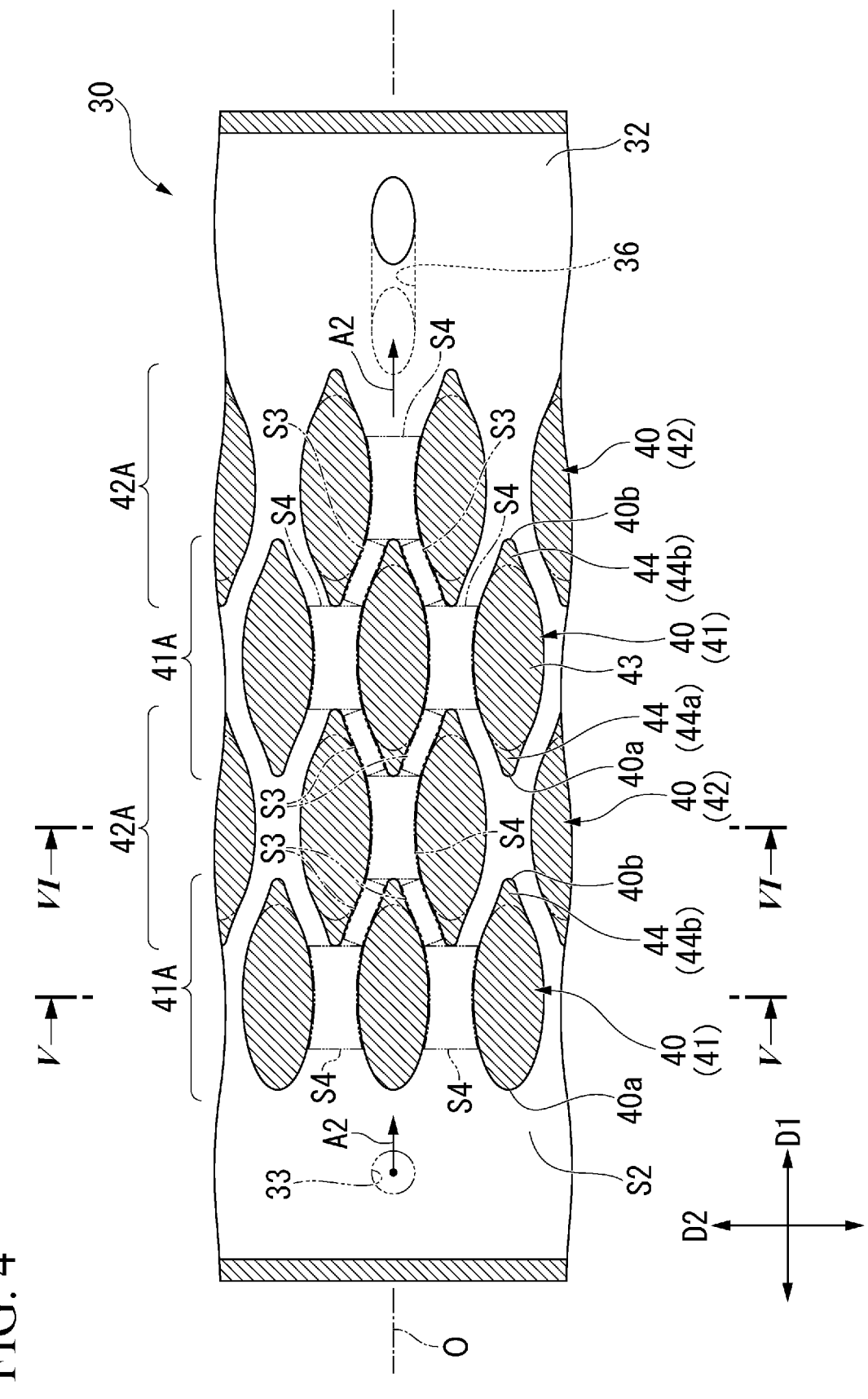
FIG. 4 is a plan view showing a schematic configuration of a second panel according to the first embodiment of the present disclosure when viewed in a height direction.

As shown in FIGS. 3 and 4, the combustor panel 30 includes a first panel 31, a second panel 32, and a fin 40. The combustor panel 30 has a double wall cooling structure formed by the first panel 31 and the second panel 32 that are arranged to face each other in the height direction D3. That is, the direction in which the first panel 31 and the second panel 32 face each other is orthogonal to the width direction D2.

(First Panel)

The first panel 31 is formed into a rectangular plate shape extending in the direction of the axis O. The first panel 31 is disposed on the side opposite to the combustion area S1 with the second panel 32 interposed there between.

An impingement cooling hole 33 is formed at an end of the first panel 31 on one side of the length direction D1. In this embodiment, the end of the first panel 31 on one side of the length direction D1 is an end of the first panel 31 on the side of the compressor 4 in the direction of the axis O (see FIG. 1). The impingement cooling hole 33 penetrates the first panel 31 in the height direction D3. The impingement cooling hole 33 has a perfect circular cross-sectional shape.

part of the compressed air A1 sent from the compressor 4 to the combustion chamber 10 is supplied into the combustor panel 30 through the impingement cooling bole 33. The compressed air A1 supplied to the combustor panel 30 becomes cooling air A2 that cools the combustor panel 30.

(Second Panel)

The second panel 32 is formed to have the same shape and dimensions as the first panel 31. The second panel 32 extends in the direction of the axis O). The second panel 32 is disposed closer to the combustion area S1 than the first panel 31. The second panel 32 and the first panel 31 define a flow path S2 through which the cooling air A2 flows. A surface of the second panel 32 opposite to the flow path S2 is a gas path surface 35 that is allowed be brought into contact with the combustion gas G.

An effusion cooling hole 36 is formed at an end of the second panel 32 on the other side of the length direction D1. In this embodiment, the end of the second panel 32 on the other side of the length direction D1 is the end of the second panel 32 on the side of the turbine 11 in the direction of the axis O (see FIG. 1). The effusion cooling hole 36 is provided at a position overlapping the impingement cooling hole 33 in the width direction D2. The effusion cooling hole 36 penetrates the second panel 32. The effusion cooling hole 36 extends linearly toward the impingement cooling hole 33 in the length direction D1 as it goes toward the combustion area S1 in the height direction D3. In this way, the effusion cooling hole 36 is inclined with respect to the length direction D1. The cross-sectional shape of the effusion cooling hole 36 is an ellipse whose major axis direction coincides with the length direction D1.

The cooling air A2 flows in the flow path S2 along the length direction D1 and is discharged from the flow path S2 to the combustion area S1 through the effusion cooling hole 36.

Hereinafter, a direction along a line connecting the center point of the impingement cooling hole 33 and the center point of the effusion cooling hole 36 when viewed from the height direction D3 along the surface of the second panel 32 on the side opposite to the gas path surface 35 in the flow direction of the cooling air A2 is referred to as the flow direction. The flow direction in this embodiment coincides with the length direction D1. Further, in the flow direction, the side on which the cooling air A2 flows is simply referred to as the upstream side, and the opposite side is referred to as the downstream side.

(Fin)

As shown in FIGS. 3 and 4, the fins 40 are formed between the first panel 31 and the second panel 32 in the flow path S2. A plurality of the fins 40 are formed at intervals in the length direction D1 and the width direction D2. The fins 40 are formed to have a streamlined shape. The fin 40 includes a fin main body 43 and a protrusion 44.

The fin main body 43 is formed in an elliptical shape of which a major axis direction coincides with the length direction D1 when viewed from the height direction D3. Both edges of the fin main body 43 in the length direction D1 extend linearly in the height direction D3 when viewed from the width direction D2.

The protrusions 44 are provided at both ends of the fin main body 43 in the length direction D1. However, in the fin 40 which is located on the most upstream side of the plurality of fins 40 arranged in the length direction D1, the protrusion 44 is provided only at the downstream end of the fin main body 43. The protrusion 44 has a tapered shape in which the dimension in the width direction D2 gradually decreases as it is separated from the fin main body 43 in the length direction D1 when viewed from the height direction D3. When viewed from the height direction D3, the outer edge of the protrusion 44 is smoothly connected to the outer edge of the fin main body 43. The end of the protrusion 44 on the side opposite to the fin main body 43 in the direction of the axis O is formed into a rounded shape.

That is, the fin 40 is formed in a streamlined shape in which the dimension of the width direction D2 gradually increases towards the center portion in the flow direction from the upstream side and the dimension of the width direction D2 gradually decreases towards the downstream side from the center portion in the flow direction when viewed from the height direction D3.

In one fin 40, the upstream protrusion 44 is referred to as a front protrusion 44a and the downstream protrusion 44 is referred to as a rear protrusion 44b. The upstream edge of the front protrusion 44a is a front edge 40a of the fin 40 and the downstream edge of the rear protrusion 44b is a rear edge 40b of the fin 40.

The front edge 40a is linearly inclined to extend toward the upstream side from the second panel 32 to the first panel 31 in the height direction D3, when it is viewed from the width direction D2. However, since the fin 40 located on the most upstream side does not include the front protrusion 44a, the upstream edge of the fin main body 43 is the front edge 40a of the fin 40. In this case, the front edge 40a extends to be perpendicular to the surface of the second panel 32.

The rear edge 40b is linearly inclined to extend toward the downstream side from the second panel 32 to the first panel 31 in the height direction D3, when it is viewed from the width direction D2.

In this way, the dimension L of the fin 40 in the flow direction is increased towards the first panel 31 from the second panel 32 in the height direction D3.

Figure 5:
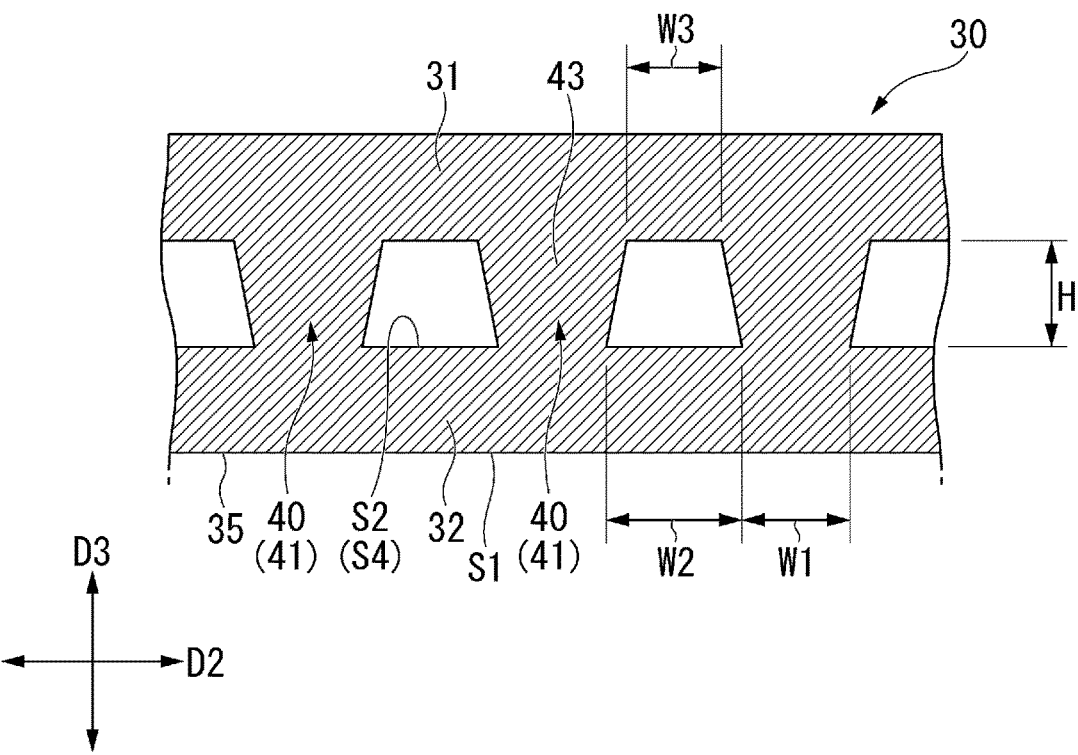
FIG. 5 is a cross-sectional view taken along a line V-V of FIG. 4.
Figure 6:
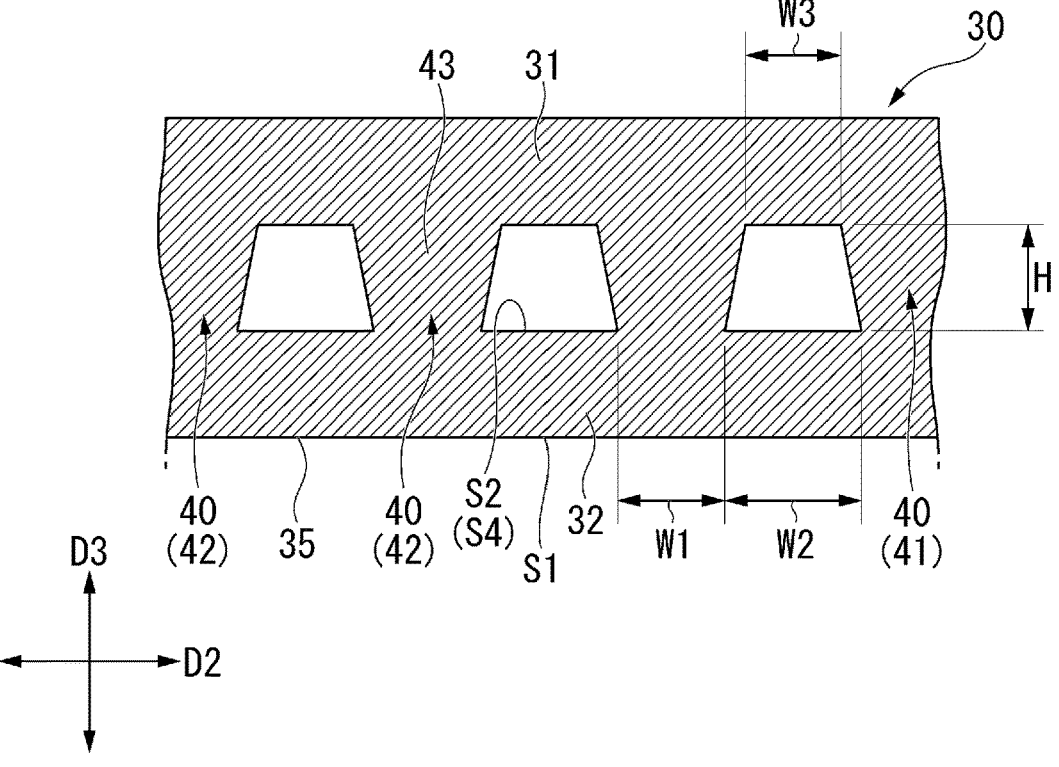
FIG. 6 is a cross-sectional view taken along a line VI-VI of FIG. 4.

Further, as shown in FIGS. 5 and 6, the dimension of the fin 40 in the width direction D2 increases towards the first panel 31 from the second panel 32 in the height direction D3.

Further, as shown in FIGS. 3 and 4, the plurality of fins 40 includes first fins 41 and second fins 42. The first fins 41 are the fins 40 that constitute a first fin group 41A by being arranged at intervals in the width direction D2 at the same position in the flow direction position. The second fins 42 are the fins 40 that constitute a second fin group 42A by being arranged at intervals in the width direction D2 at different positions in the flow direction from those of the first fin group 41A.

The first fin groups 41A and the second fin groups 42A are alternately provided in the flow direction. The first fin group 41A and the second fin group 42A which are adjacent to each other in the flow direction are provided such that the first fin 41 and the second fin 42 are shifted from each other in the width direction D2 and overlap each other when viewed from the width direction D2.

The flow path S2 of the cooling air A2 is defined to have a mesh shape when viewed from the height direction D3 by the fins 40. Specifically, the flow path S2 is defined as below.
(Small Flow Path)

Figure 7:
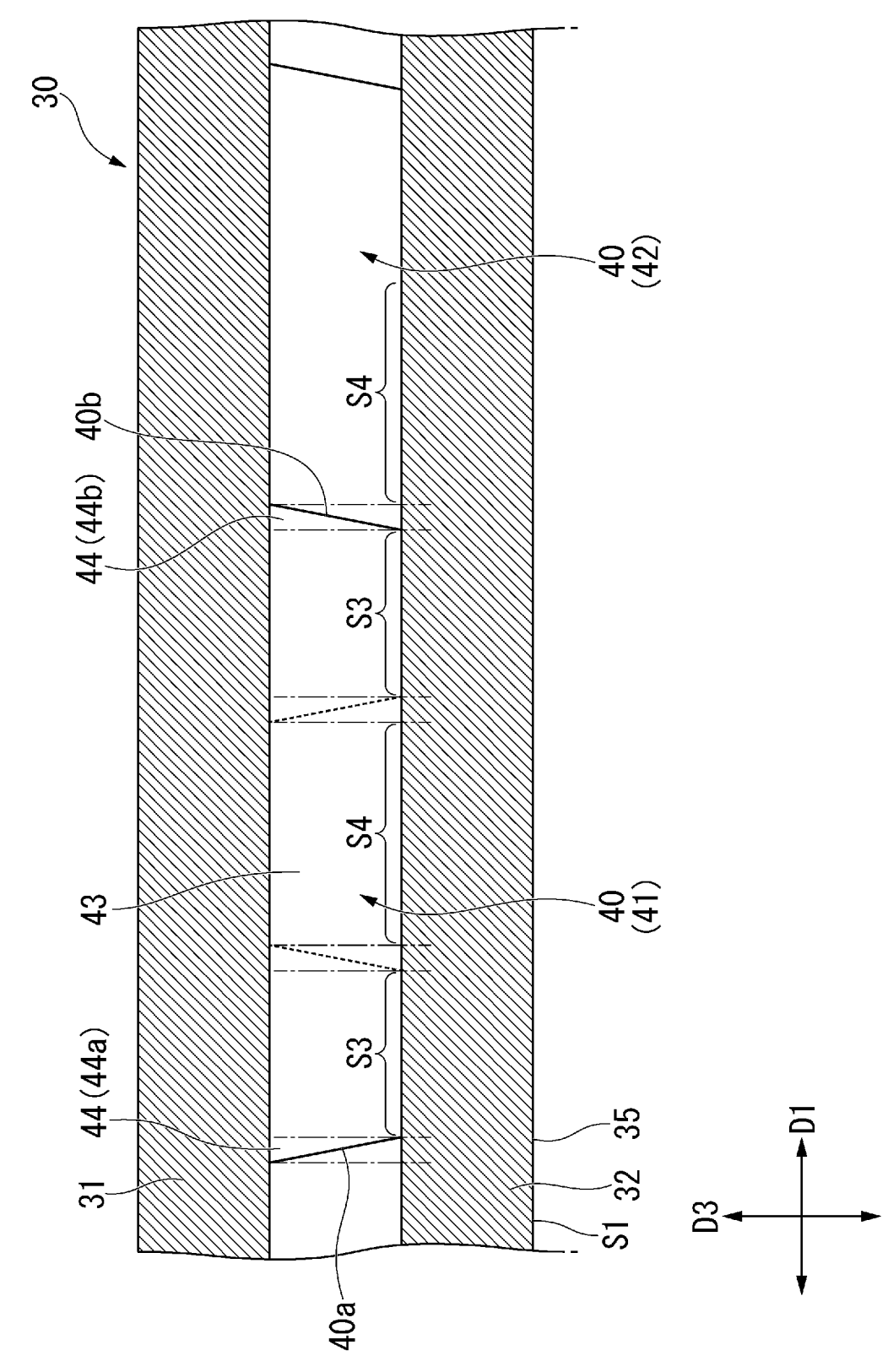
FIG. 7 is an enlarged view of a part VII in FIG. 3.

As shown in FIGS. 3, 4, and 7, the first fin 41 and the second fin 42 are arranged to overlap each other when viewed from the width direction D2 to define a small flow path S3. The small flow path S3 is the flow path S2 defined by a portion of the overlapping portion of the first fin 41 and the second fin 42 in the width direction D2 excluding both edges 40a and 40b in the flow direction. The small flow path S3 is formed in a trapezoidal shape of which a dimension in the width direction D2 gradually decreases towards the first panel 31 from the second panel 32 in the height direction D3 when viewed from the flow direction.
(Large Flow Path)

A large flow path S4 is defined between the first fins 41 adjacent to each other in the width direction D2 and between the second fins 42 adjacent to each other in the width direction D2. The large flow path S4 is the flow path S2 defined by a portion of the overlapping portion of the first fins 41 in the width direction D2 excluding the overlapping portion of the first fin 41 and the second fin 42 in the width direction D2. The large flow path S4 is formed at a position overlapping the center portion of the fin 40 in the flow direction in the width direction D2. The most upstream and most downstream large flow paths S4 are formed in the same area as the other large flow path S4 with respect to the fins 40 that overlap in the width direction D2. In this embodiment, the most upstream and most downstream large flow paths S4 are formed so that the dimension in the length direction D1 are the same as those of the other large flow paths S4.

The large flow path S4 connects the ends in the length direction D1 of two small flow paths S3, adjacent to each other in the width direction D2. The large flow path S4 is formed in a trapezoidal shape of which a dimension in the width direction D2 gradually decreases towards the first panel 31 from the second panel 32 in the height direction D3 when viewed from the flow direction.

The small flow path S3 and the large flow path S4 are defined to be alternately provided in the flow direction. That is, the flow path S2 is defined to meander in the flow direction.
(Dimensions of Fin and Flow Path)

Referring to FIGS. 5 and 6, the dimensions of the fin 40 and the flow path S2 will be described. The first fin 41 and the second fin 42 are formed to have the same shape and dimensions. Therefore, the dimensions of the first fin 41 and the second fin 42 will be collectively described as the dimensions of the fin 40.

At the center portion of the fin 40 in the flow direction, the dimension W1 in the width direction D2 on the side of the second panel 32 is larger than 0 times and equal to or smaller than 2 times the dimension H in the height direction D3 of the flow path S2. The dimension H is, for example, 1.00 mm.

At the center portion of the large flow path S4 in the flow direction, the dimension W2 in the width direction D2 on the side of the second panel 32 is larger than 0 times and equal to or smaller than 2 times the dimension H, and the dimension W3 in the width direction D2 on the side of the first panel 31 is larger than 0 times and equal to or smaller than 2 times the dimension H. The dimension W2 is larger than the dimension W3. The dimension W2 is, for example, 0.80 mm. The dimension W3 is, for example, 0.56 mm.

Further, the flow path cross-sectional area of the small flow path S3 is constant at each position in the flow direction. The flow path cross-sectional area of the large flow path S4 is constant at each position in the flow direction. Here, the constant flow path cross-sectional area means that the flow path cross-sectional area in each flow path (each small flow path S3 and each large flow path S4) is within +30% of the average value of the flow path cross-sectional area of the flow direction.

Further, the flow path cross-sectional area of the large flow path S4 is equal to or larger than the flow path cross-sectional area of the small flow path S3 and equal to or smaller than 3 times the flow path cross-sectional area of the small flow path S3. The flow path cross-sectional area of the large flow path S4 is, for example, 2 times the flow path cross-sectional area of the small flow path S3.

A connecting rib (not shown) is provided in the outer peripheral surface of the fin 40 at the connection portion with the first panel 31 and the second panel 32. The connecting rib smoothly connects the surfaces of the fin main body 43 and the protrusion 44 to the surface of the first panel 31 or the second panel 32. The outer surface of the connecting rib is formed in an arcuate shape that extends inward in cross-sectional view.

Operation and Effect

Next, the cooling effect of the double wall cooling structure of the combustor panel 30 will be described with reference to FIGS. 1 to 4.

The compressed air A1 flowing on the outside in the radial direction of the first panel 31 is supplied into the combustor panel 30 through the impingement cooling hole 33 due to the differential pressure between the inside and outside of the combustor 19 and becomes the cooling air A2. When the cooling air A2 is supplied into the flow path S2, the cooling air collides with the second panel 32 to cool the second panel 32 disposed on the side of the combustion area S1. In this way, so-called impingement cooling is performed.

The cooling air A2 colliding with the second panel 32 flows along the length direction D1 between the erected fins 40. Hereinafter, the flow along the length direction D1 of the cooling air A2 will be referred to as a primary flow.

The cooling air A2 flowing through the large flow path S4 branches into two small flow paths S3 adjacent to each other in the width direction D2. The cooling air A2 flowing through two small flow paths S3 adjacent to each other in the width direction D2 joins together in the downstream large flow path S4. The cooling air A2 flows in a meandering manner within the combustor panel 30 by flowing from the large flow path S4 to the small flow path S3 and from the small flow path S3 to the large flow path S4. Accordingly, since the flow path S2 becomes long, cooling can be performed with less cooling air A2. That is, the cooling efficiency of the cooling air A2 is improved.

Further, the fin 40 improves the cooling efficiency of the cooling air A2 flowing through the flow path S2 by transferring the heat on the inner surface side exposed to high temperatures into the flow path S2 and increasing the heat release area of the second panel 32 in the flow path S2.

Part of the cooling air A2 flowing between the fins 40 is introduced into the effusion cooling hole 36 due to the pressure difference between the flow path S2 and the combustion area S1. The cooling air A2 introduced into the effusion cooling hole 36 flows out toward the combustion area S1 by absorbing heat of the second panel 32 while flowing through the long inclined path.

Then, the cooling air A2 flowing out toward the combustion area S1 flows along the gas path surface 35 of the second panel 32 to form an air film. This air film functions to reduce the heat input transferred from the combustion area S1 to the second panel 32. In this way, so-called film cooling is performed.

In this way, in this embodiment, composite cooling is performed by combining impingement cooling or film cooling that improves the cooling efficiency by the meandering of the flow path S2, promotes the heat transfer by the fins 40, and improves the cooling efficiency by the inclination of the effusion cooling hole 36.

Incidentally, when the cooling air A2 supplied into the flow path S2 collides with the second panel 32, a secondary flow in which the cooling air A2 is separated from the second panel 32 may occur in addition to the primary flow. As the secondary flow increases, the second panel 32 exposed to high temperatures cannot be directly cooled, and the cooling effect decreases.

According to this embodiment, the dimension of the fin 40 in the width direction D2 be increased towards the first panel 31 from the second panel 32. Accordingly, the flow path S2 becomes wider as it goes toward the second panel 32 in the direction in which the first panel 31 and the second panel 32 face each other when viewed from the flow direction. Therefore, the secondary flow of the cooling air A2 toward the second panel 32 in the direction in which the first panel 31 and the second panel 32 face each other is suppressed. Thus, the cooling air A2 flows more easily along the second panel 32, the flow velocity on the side of the second panel 32 can be improved more than on the side of the first panel 31. Thus, the second panel 32 can be directly cooled by the cooling air A2. Therefore, the cooling effect of the cooling air A2 can be improved.

Further, the fin 40 is formed in a streamlined shape. Accordingly, the cooling air A2 can be suppressed from separating from the surface of the fin 40. The cooling air A2 flows along the surface of the fin 40. Therefore, the combustion heat can be efficiently transferred from the fin 40 to the cooling air A2. Further, the cooling air A2 can be suppressed from separating from the surface of the fin 40. Accordingly, the pressure loss of the cooling air A2 is reduced and the heat exchange amount between the fin 40 and the cooling air A2 can be increased. Thus, the cooling effect of the cooling air A2 can be improved.

In this embodiment, the dimension L of the fin 40 in the flow direction is increased towards the first panel 31 from the second panel 32. Therefore, the flow path S2 on the side of the second panel 32 becomes wider than the flow path S2 on the side of the first panel 31. Accordingly, more cooling air A2 can flow through the flow path S2 on the side of the second panel 32 than the flow path S2 on the side of the first panel 31. Thus, the heat exchange amount between the second panel 32 and the cooling air A2 can be increased. Thus, the cooling effect of the cooling air A2 can be improved.

In this embodiment, the first fin group 41A and the second fin group 42A are alternately provided in the flow direction. The first fin group 41A and the second fin group 42A which are adjacent to each other in the flow direction are provided such that the first fin 41 and the second fin 42 are shifted from each other in the width direction D2 and overlap each other when viewed from the width direction D2. Accordingly, the fins 40 can be densely arranged within the flow path S2. Therefore, the heat release area of the fin 40 can be increased. Thus, the cooling effect of the second panel 32 by the fin 40 can be improved. Thus, the cooling effect of the cooling air A2 can be improved.

In this embodiment, the flow path cross-sectional area of the small flow path S3 is constant. Accordingly, since it is possible to suppress acceleration or deceleration of the cooling air A2 within the small flow path S3, it is possible to control the flow velocity of the cooling air A2 within the small flow path S3 to be constant. Thus, it is possible to suppress unevenness in the flow rate of the cooling air A2 within the small flow path S3. Therefore, it is possible to suppress unevenness in the cooling effect of the cooling air A2 within the flow path S2.

In this embodiment, the flow path cross-sectional area of the large flow path S4 between the first fins 41 and between the second fins 42 is constant. Accordingly, since it is possible to suppress acceleration or deceleration of the cooling air A2 within the large flow path S4, it is possible to control the flow velocity of the cooling air A2 within the large flow path S4 to be constant. Thus, it is possible to suppress unevenness in the flow rate of the cooling air A2 within the large flow path S4. Therefore, it is possible to suppress unevenness in the cooling effect of the cooling air A2 within the flow path S2.

In this embodiment, the flow path cross-sectional area of the large flow path S4 is equal to or larger than the flow path cross-sectional area of the small flow path S3 and equal to or smaller than 3 times the flow path cross-sectional area of the small flow path S3. Accordingly, it is possible to suppress acceleration or deceleration of the cooling air A2 while flowing between the large flow path S4 and the small flow path S3 and to control the flow velocity to be constant.

Therefore, it is possible to suppress unevenness in the cooling effect of the cooling air A2 within the flow path S2.

Second Embodiment

Hereinafter, a combustor panel 130 and a combustor 119 according to a second embodiment of the present disclosure will be described with reference to FIGS. 8 and 9. In the second embodiment, the same reference numerals are given to the same components as in the first embodiment, and detailed descriptions are omitted as appropriate. In the second embodiment, the shape and dimension of the fin 140 are different from those of the first embodiment.

(Fin)

Figure 9:
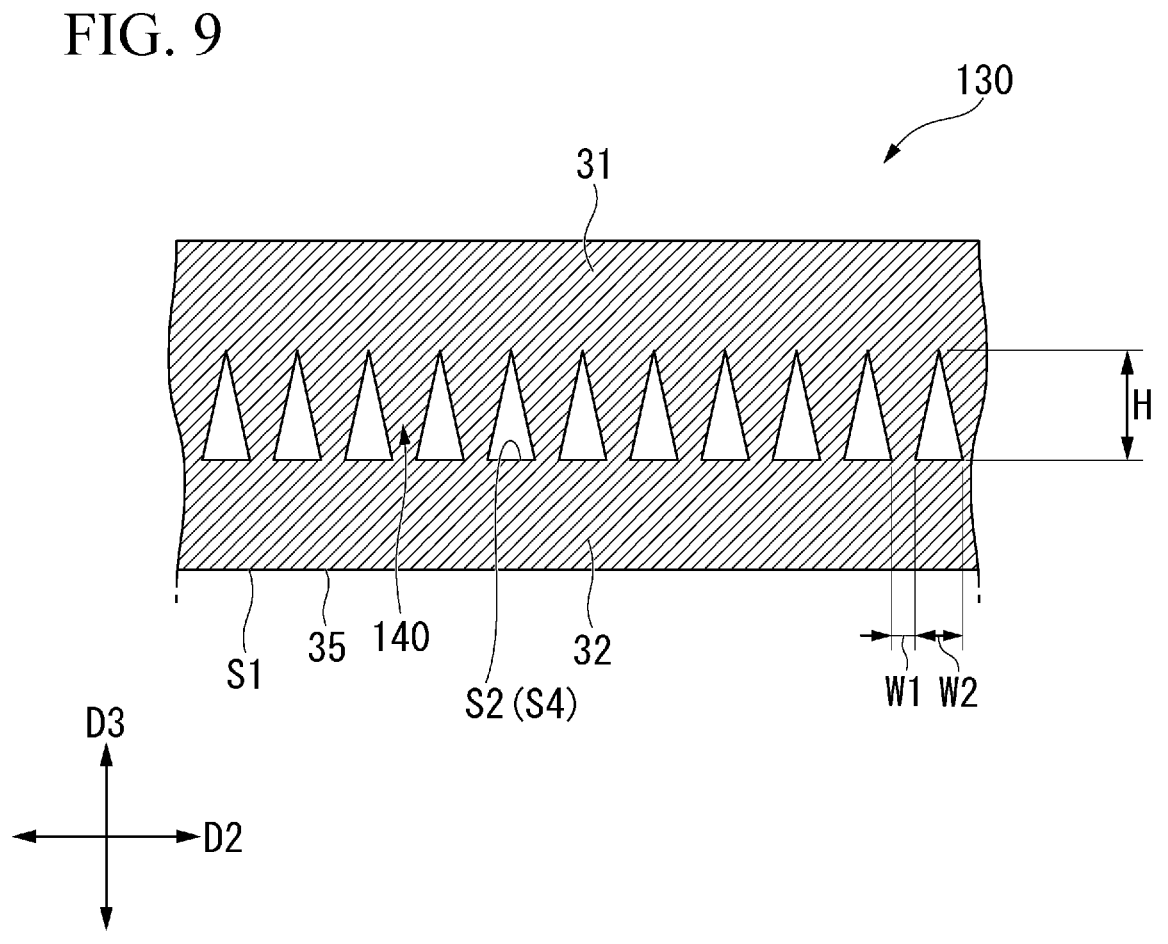

FIG. 9 is a diagram corresponding to FIG. 5 or FIG. 6 of the first embodiment.

Figure 8:
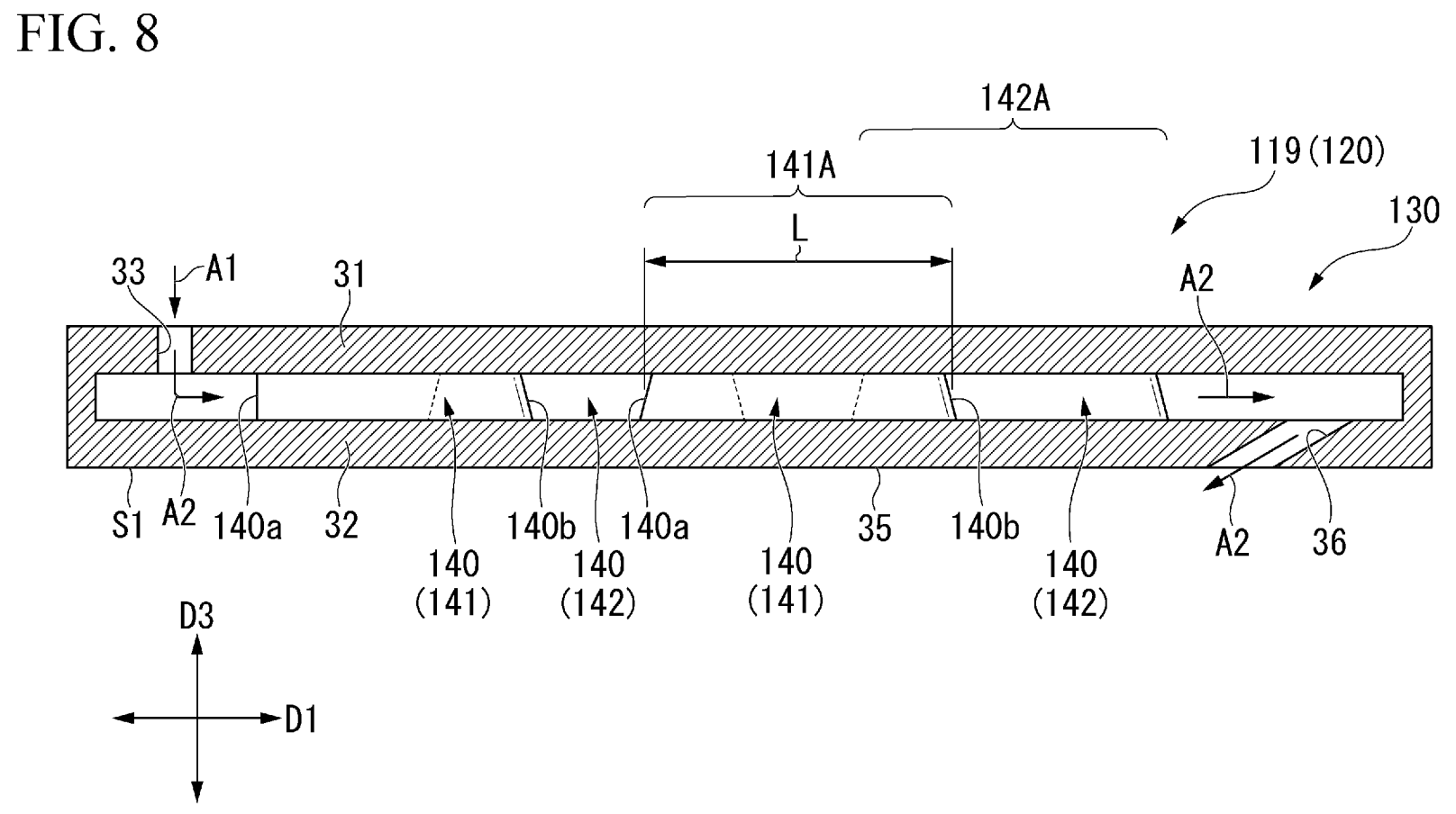

As shown in FIGS. 8 and 9, a front edge 140a of the fin 140 is linearly inclined to extend toward the downstream side from the second panel 32 to the first panel 31 in the height direction D3 when viewed from the width direction D2. However, the front edge 140a of the fin 140 located on the most upstream sides extends to be perpendicular to the surface of the second panel 32.

The rear edge 140b of the fin 140 is linearly inclined to extend toward the upstream side from the second panel 32 to the first panel 31 in the height direction D3 when viewed from the width direction D2.

That is, the dimension L of the fin 140 in the flow direction decreases from the second panel 32 to the first panel 31 in the height direction D3.

The gap between the first fins 141 constituting the first fin group 141A in the width direction D2 is narrower than the gap between the first fins 41 of the first embodiment in the width direction D2.

The gap between the second fins 142 constituting the second fin group 142A in the width direction D2 is narrower than the gap between the second fins 42 of the first embodiment in the width direction D2.

(Large Flow Path)

The center portion of the large flow path S4 in the flow direction is formed in a triangular shape of which a dimension in the width direction D2 gradually decreases from the second panel 32 to the first panel 31 in the height direction D3 when viewed from the flow direction.

(Dimensions of Fin and Flow Path)

At the center portion of the fin 140 in the flow direction, the dimension W1 on the side of the second panel 32 in the width direction D2 is larger than 0 times and equal to or smaller than 1.0 times the dimension H of the flow path S2 in the height direction D3. The dimension H is, for example, 1.00 mm.

At the center portion of the large flow path S4 in the flow direction, the dimension W2 on the side of the second panel 32 in the width direction D2 is equal to or larger than the dimension W1 in the width direction D2 and equal to or smaller than 3 times the dimension W1 in the width direction D2 on the side of the second panel 32 at the center portion of the fin 140 in the flow direction.

Operation and Effect

In this embodiment, the dimension L of the fin 140 in the flow direction is decreased towards the first panel 31 from the second panel 32. Accordingly, the heat release area of the fin 140 can be increased on the side of the second panel 32 rather than the side of the first panel 31. Thus, the cooling effect of the second panel 32 by the fin 140 can be improved. Thus, the cooling effect of the cooling air A2 can be improved.

In this embodiment, the dimension W1 is larger than 0 and equal to or smaller than the dimension H of the flow path S2 in the height direction D3. Accordingly, the fins 140 can be densely formed. Therefore, since the heat release area of the fin 140 increases, the heat exchange amount increases. Thus, the cooling effect of the cooling air A2 can be improved.

OTHER EMBODIMENTS

Although the embodiments of the present disclosure have been described above in detail with reference to the drawings, the specific configuration is not limited to these embodiments, and includes design changes within the scope of the gist of the present disclosure.

Furthermore, in the above-described embodiments, although the combustor liners 20 and 120 are annular liners, the present disclosure is not limited thereto and the combustor liners 20 and 120 may be so-called can-type liners formed in a cylindrical shape.

Furthermore, in the above-described embodiments, although the flow direction coincides with the length direction D1, the present disclosure is not limited thereto and the flow direction may intersect the length direction D1.

Furthermore, in the above-described embodiments, although the front edges 40a and 140a and the rear edges 40b and 140b of the fins 40 and 140 are linearly inclined when viewed from the width direction D2, the present disclosure is not limited thereto and the front edges 40a and 140a and the rear edges 40b and 140b of the fins 40 and 140 may be formed in an arcuate shape that extends inwardly or outwardly when viewed from the width direction D2.

Furthermore, in the above-described embodiments, although the second fins 42 and 142 are formed to have the same shape and dimensions as the first fins 41 and 141, the present disclosure is not limited thereto and the second fins 42 and 142 may be formed to have shapes different from the first fins 41 and 141. The second fins 42 and 142 may be formed to be smaller than the first fins 41 and 141. The second fins 42 and 142 may be formed to be larger than the first fins 41 and 141.

APPENDIX

The combustor panels 30 and 130 and the combustors 19 and 119 described in each embodiment are understood, for example, as below.

(1) The combustor panels 30 and 130 of the first embodiment include: the first panel 31; the second panel 32 which is facing the first panel 31 to define the flow path S2 through which the cooling air A2 flows between the first panel 31 and the second panel 32 the gas path surface 35 which is allowed to be brought into contact with the combustion gas G is formed on a surface of the second panel opposite to the flow path S2; and the plurality of streamlined fins 40 and 140 which are formed between the first panel 31 and the second panel 32 within the flow path S2 in the flow path S2 so as to be arranged at intervals from each other, and each of which has the front edges 40a and 140a at the upstream side in the flow direction of the cooling air A2 and rear edges 40b and 140b at the downstream side in the flow direction, wherein each of the fins 40 and 140 is formed such that the dimension in the width direction D2 intersecting both of the flow direction and the direction in which the first panel 31 and the second panel 32 face each other is increased towards the first panel 31 from the second panel 32.

Accordingly, the flow path S2 becomes wider toward the second panel 32 in the direction in which the first panel 31 and the second panel 32 face each other when viewed from the flow direction. Therefore, the secondary flow of the cooling air A2 toward the second panel 32 in the direction in which the first panel 31 and the second panel 32 face each other is suppressed. Thus, the cooling air A2 flows more easily along the second panel 32. Thus, the second panel 32 can be directly cooled by the cooling air A2. Therefore, the cooling effect of the cooling air A2 can be improved.

(2) The combustor panel 30 of the second aspect is the combustor panel 30 of (1), wherein the dimension of the fin 40 in the flow direction may be increased towards the first panel 31 from the second panel 32.

Accordingly, the flow path S2 on the side of the second panel 32 becomes wider than the flow path S2 on the side of the first panel 31. Therefore, more cooling air A2 can flow through the flow path S2 on the side of the second panel 32 than the flow path S2 on the side of the first panel 31. Thus, the heat exchange amount between the second panel 32 and the cooling air A2 can be increased.

(3) The combustor panel 130 of the third aspect is the combustor panel 130 of (1), wherein the dimension of the fin 140 in the flow direction may be decreased towards the first panel 31 from the second panel 32.

Accordingly, the heat release area of the fin 140 can be increased on the side of the second panel 32 rather than the side of the first panel 31. Thus, the cooling effect of the second panel 32 by the fin 140 can be improved.

(4) The combustor panels 30 and 130 of the fourth aspect are the combustor panels 30 and 130 of any one of (1) to (3), wherein the plurality of fins 40 and 140 may include the first fin groups 41A and 141A each of which including the first fins 41 and 141 arranged at intervals in the width direction D2 at a first position in the flow direction; and the second fin groups 42A and 142A each of which including the second fins 42 and 142 arranged at intervals in the width direction D2 at a second position different from the first position in the flow direction, wherein the first fin groups 41A and 141A and the second fin groups 42A and 142A may be alternately provided in the flow direction, and wherein the first fin group 41A and 141A and the second fin group 42A and 142A which are adjacent to each other in the flow direction may be provided such that the first fins 41 and 141 and the second fins 42 and 142 are shifted from each other in the width direction D2 and overlap each other when viewed from the width direction D2.

Accordingly, the fins 40 and 140 can be densely arranged within the flow path S2. Therefore, the heat release area of the fins 40 and 140 can be increased. Thus, the cooling effect of the second panel 32 by the fins 40 and 140 can be improved.

(5) The combustor panels 30 and 130 of the fifth aspect are the combustor panels 30 and 130 of (4), wherein the first fins 41 and 141 and the second fins 42 and 142 may be arranged to overlap each other when viewed from the width direction D2 to define the plurality of small flow paths S3, and wherein each of the flow paths may have a constant cross-sectional area.

Accordingly, it is possible to suppress unevenness in the flow rate of the cooling air A2 within the small flow path S3.

Therefore, it is possible to suppress unevenness in the cooling effect of the cooling air A2 within the flow path S2.

(6) The combustor panels 30 and 130 of the sixth aspect is the combustor panels 30 and 130 of (4) or (5), wherein the plurality of large flow paths S4 may be defined between the first fins 41 and 141 adjacent to each other in the width direction D2 and between the second fins 42 and 142 adjacent to each other in the width direction D2, and wherein each of the large flow paths S4 may have a constant flow path cross-sectional area.

Accordingly, it is possible to suppress unevenness in the flow rate of the cooling air A2 within the large flow path S4. Therefore, it is possible to suppress unevenness in the cooling effect of the cooling air A2 within the flow path S2.

(7) The combustors 19 and 119 of the seventh aspect include the combustor liners 20 and 120 formed by the combustor panels 30 and 130 according to any one of (1) to (6).

INDUSTRIAL APPLICABILITY

It is possible to provide the combustor panel and the gas turbine combustor capable of improving the cooling effect of cooling air.

REFERENCE SIGNS LIST

1 Gas turbine
2 Gas turbine casing
3 Gas turbine rotor shaft
4 Compressor
5 Intake duct
6 Compressor casing
7 Compressor rotor shaft
8 Compressor rotor blade stage
8a Compressor rotor blade
9 Compressor stator blade stage
9a Compressor stator blade
10 Combustion chamber
11 Turbine
12 Turbine rotor shaft
13 Turbine casing
14 Turbine rotor blade stage
14a Turbine rotor blade
15 Turbine stator blade stage
15a Turbine stator blade
16 Exhaust nozzle
17 Injection port
19, 119 Combustor (gas turbine combustor)
20, 120 Combustor liner
21 Fuel supply nozzle
22 Swirler
23 Inner wall portion
24 Outer wall portion
30, 130 Combustor panel
31 First panel
32 Second panel
33 Impingement cooling hole
35 Gas path surface
36 Effusion cooling hole
40, 140 Fin
40a, 140a Front edge
40b, 140b Rear edge
41, 141 First fin
41A, 141A First fin group
42, 142 Second fin 42A, 142A Second fin group
43 Fin main body
44 Protrusion
44*a* Front protrusion
44*b* Rear protrusion
A1 Compressed air
A2 Cooling air
D1 Length direction
D2 Width direction
D3 Height direction
F Fuel
G Combustion gas
O Axis
S1 Combustion area
S2 Flow path
S3 Small flow path
S4 Large flow path
L Dimension (of fin in flow direction)
W1 Dimension (on second panel side in width direction at center portion of flow path in flow direction)
W2 Dimension (on second panel side in width direction at center portion of large flow path in flow direction)
W3 Dimension (on first panel side in width direction at center portion of large flow path in flow direction)
H Dimension (of flow path in height direction)

The invention claimed is:

1. A combustor panel comprising:
a first panel;
a second panel which is facing the first panel to define a flow path, through which cooling air flows, between the first panel and the second panel, a gas path surface which is allowed to be brought into contact with combustion gas is formed on a surface of the second panel opposite to the flow path; and
a plurality of streamlined fins which are formed between the first panel and the second panel in the flow path so as to be arranged at intervals from each other, and each of which has a front edge at an upstream side in a flow direction of the cooling air and a rear edge at a downstream side in the flow direction,
wherein each of the plurality of streamlined fins connects the first panel and the second panel, and
each of the plurality of streamlined fins is formed such that a dimension in a width direction intersecting both of the flow direction and a direction in which the first panel and the second panel face each other is increased towards the first panel from the second panel, and
each of the plurality of streamlined fins is formed such that the dimension of the width direction gradually increases towards the rear edge side in the flow direction from the front edge and the dimension of the width direction gradually increases towards the front edge side in the flow direction from the rear edge,
wherein each of the plurality of streamlined fins includes a fin main body which is formed in an elliptical shape of which a major axis direction coincides with the flow direction when viewed from the direction in which the first panel and the second panel face each other; and
a protrusion which is provided at least one of both ends of the fin main body in the flow direction and has a tapered shape in which the dimension in the width direction gradually decreases as it is separated from the fin main body in the flow direction when viewed from the direction in which the first panel and the second panel face each other, and
wherein a dimension of each of the plurality of streamlined fins in the flow direction is decreased towards the first panel from the second panel.

2. The combustor panel according to claim 1,
wherein the plurality of streamlined fins includes:
first fin groups each of which including first fins arranged at intervals in the width direction at a first position in the flow direction; and
second fin groups each of which including second fins arranged at intervals in the width direction at a second position different from the first position in the flow direction,
wherein the first fin groups and the second fin groups are alternately provided in the flow direction, and
wherein the first fin group and the second fin group which are adjacent to each other in the flow direction are provided such that the first fins and the second fins are shifted from each other in the width direction and overlap each other when viewed from the width direction.

3. The combustor panel according to claim 2,
wherein the first fins and the second fins are arranged to overlap each other when viewed from the width direction to define a plurality of small flow paths, and
wherein each of the plurality of small flow paths has a constant flow path cross-sectional area.

4. The combustor panel according to claim 2,
wherein a plurality of large flow paths are defined between the first fins adjacent to each other in the width direction and between the second fins adjacent to each other in the width direction, and
wherein each of the plurality of large flow paths has a constant flow path cross-sectional area.

5. A gas turbine combustor comprising:
a combustor liner formed by the combustor panel according to claim 1.

* * * * *